(12) United States Patent
Zagzebski et al.

(10) Patent No.: US 8,111,810 B2
(45) Date of Patent: Feb. 7, 2012

(54) METHOD FOR PRODUCING HIGHLY CONSTRAINED ULTRASOUND IMAGES

(75) Inventors: James A. Zagzebski, Madison, WI (US); Charles A. Mistretta, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 722 days.

(21) Appl. No.: 12/270,631

(22) Filed: Nov. 13, 2008

(65) Prior Publication Data
US 2009/0129651 A1    May 21, 2009

Related U.S. Application Data

(60) Provisional application No. 60/987,457, filed on Nov. 13, 2007.

(51) Int. Cl.
*G06K 9/00* (2006.01)
(52) U.S. Cl. ........................................................ 378/131
(58) Field of Classification Search .................. 382/128, 382/130–132; 600/447
See application file for complete search history.

(56) References Cited

U.S. PATENT DOCUMENTS

| | | | |
|---|---|---|---|
| 7,358,730 B2 | 4/2008 | Mistretta et al. | |
| 7,408,347 B2 | 8/2008 | Mistretta et al. | |
| 7,519,412 B2 | 4/2009 | Mistretta et al. | |
| 7,545,901 B2 | 6/2009 | Mistretta et al. | |
| 7,647,088 B2 | 1/2010 | Mistretta et al. | |
| 7,711,166 B2 | 5/2010 | Mistretta et al. | |
| 7,865,227 B2 | 1/2011 | Mistretta et al. | |
| 2004/0225221 A1* | 11/2004 | Olsson ........................... | 600/447 |
| 2007/0009080 A1 | 1/2007 | Mistretta et al. | |
| 2007/0010731 A1 | 1/2007 | Mistretta et al. | |
| 2007/0038073 A1 | 2/2007 | Mistretta et al. | |
| 2007/0106149 A1 | 5/2007 | Mistretta et al. | |
| 2007/0156044 A1 | 7/2007 | Mistretta et al. | |
| 2007/0167707 A1 | 7/2007 | Mistretta et al. | |
| 2007/0167728 A1 | 7/2007 | Mistretta et al. | |
| 2008/0199063 A1 | 8/2008 | O'Halloran et al. | |
| 2008/0219535 A1 | 9/2008 | Mistretta et al. | |
| 2009/0076369 A1 | 3/2009 | Mistretta et al. | |
| 2010/0286504 A1 | 11/2010 | Mistretta et al. | |

OTHER PUBLICATIONS

Wu et al; Hypr-Trick: Highly Undersampled Hybrid Radial/Cartesian Acquisition with Highly Constrained Backprojection Reconstruction for Time Resolved MRI; Proc. Intl. Soc. Mag. Reson. Med. 14 (2006); 1 page.

Supanich et al; Dose Reduction in Neuro CT Exams Using Highly Constrained Back Projection (HYPR) Techniques; hppt://rsna2006.rsna.org; Nov. 30, 2006; 2 pages.

(Continued)

*Primary Examiner* — Irakli Kiknadze
(74) *Attorney, Agent, or Firm* — Quarles & Brady LLP

(57) ABSTRACT

A highly constrained image processing method is used to improve the quality, including spatial resolution and signal-to-noise ratio (SNR), of ultrasound image frames. Ultrasound image frames are accumulated to form a composite image that contains a priori information about the subject being imaged. This composite image is used in a HYPR processing method to improve the quality of the ultrasound image frame. For example, the SNR of the composite image is increased as a function of the number of ultrasound image frames used to produce it, and this increased SNR is passed on to each highly constrained image frame. Additionally, high spatial resolution ultrasound images are produced using an undersampled sampling density, and the quality of these images is restored to substantially the same level as a fully sampled image.

15 Claims, 10 Drawing Sheets

OTHER PUBLICATIONS

Mistretta, C.A.; Prospects for Acceleration and Dose Reduction in Selected MR and X-Ray CT Cardiovascular Applications; Proc. Intl. Soc. Mag. Reson. Med. 14 (2006); 1 page.

Mistretta et al; Highly Constrained Backprojection for Time-Resolved MRI; Mag. Reson. Med. 55:30-40 (2006).

Wisconsin Alumni Research Foundation HYPE Portfolio Flow Chart; 3 pages; Jan. 19, 2011.

* cited by examiner

METHOD FOR PRODUCING HIGHLY CONSTRAINED ULTRASOUND IMAGES

CROSS-REFERENCE TO RELATED APPLICATIONS

This application claims the benefit of U.S. Provisional patent application Ser. No. 60/987,457 filed on Nov. 13, 2007 and entitled "A Method for Producing Highly Constrained Ultrasound Images".

STATEMENT REGARDING FEDERALLY SPONSORED RESEARCH

This invention was made with government support under Grant Nos. NIH CA100373, CA111289, and EB006393, awarded by the National Institutes of Health. The United States Government has certain rights in this invention.

BACKGROUND OF THE INVENTION

The field of the invention is coherent imaging using vibratory energy, such as ultrasound and, in particular, methods for increasing the quality of ultrasound images.

There are a number of modes in which ultrasound can be used to produce images of objects. The ultrasound transmitter may be placed on one side of the object and sound transmitted through the object to the ultrasound receiver placed on the other side ("transmission mode"). More commonly, the receiver is positioned on the same side of the object as the transmitter, or the transmitter and receiver use the same transducer, and an image may be produced in which the brightness of each pixel is a function of the amplitude of the ultrasound reflected from the object back to the receiver ("backscatter" or "echo" mode). The present invention relates to a backscatter method for producing ultrasound images.

There are a number of well known backscatter methods for acquiring ultrasound data. In the so-called "A-scan" method, an ultrasound pulse is directed into the object by the transducer and the amplitude of the reflected sound is recorded over a period of time. The amplitude of the echo signal is proportional to the scattering strength of the reflectors in the beam path and the time delay is proportional to the range of the reflectors from the transducer. In the so-called "B-scan" method, the transducer transmits a series of ultrasonic pulses as its focused beam is scanned across the object along a single axis of motion. The resulting echo signals are recorded as with the A-scan method and their amplitudes are used to modulate the brightness of pixels on a display. With the B-scan method, enough data are acquired from which a two-dimensional image of the reflectors can be reconstructed. Two-dimensional real time imaging is achieved by repeating the B-scan at up to 100 image frames per second to depict moving subjects such as the beating heart.

The data acquisition rate in ultrasound is limited by pulse-echo propagation delays in tissue. Because the speed of sound in soft tissue is around 1540 m/s (0.154 cm/µs), the maximum pulse repetition frequency (PRF) that can be utilized for imaging soft tissue is 77,000/D, where D is the image depth in centimeters. When this allowable PRF is distributed over 200 beam lines/image, and the image depth is 10 cm, the maximum 2D image rate is 38.5/s. However, when acquiring a volume of data containing 50 or more such image planes, the maximum 3D acquisition rate falls to about one volume per second, which is too low for quantifying velocities in flowing blood. Methods being investigated for more rapid volume acquisitions include transmitting broad beams followed by parallel processing of narrow received beam lines. Also being investigated are methods in which total volume plane wave insonification is utilized along with storage of vast amounts of un-beamformed data from individual channels and subsequent synthetic aperture processing. In addition to the vast data density requirements of these approaches, when beamforming is restricted to the receive mode only the possibilities for strong side lobes is introduced, which could be restrictive particularly for detecting weak echoes from flowing blood.

In Doppler ultrasound imaging, the reflected echo signals are processed and the relative motion between the reflecting structures and the ultrasonic transducer measured. In these methods, the focused ultrasonic beam is scanned across the object in a manner similar to a B-scan, but multiple echoes are acquired from each refractor in the object in order to acquire sufficient information to measure its relative velocity.

Doppler ultrasound may, for example, provide blood velocity information at a series of phases during the cardiac cycle. Doppler ultrasound processing to form color flow images requires multiple transmit-receive pulse sequences along each sampled beamline to acquire the flow information. For conventional single plane "color flow" imaging, to achieve the desired high frame rates it is currently necessary to reduce the ultrasound beam line density, which results in a sparser coverage of the imaged region with interrogating acoustic beam lines. For emerging 3D and 4D flow imaging, the data acquisition times are further challenged, forcing tradeoffs between volume data acquisition rates, velocity accuracy, and spatial resolution.

While many real time ultrasound imaging clinical applications require that each image frame be acquired with less than optimal sampled data, under sampling is not the only problem. The carrier frequency of the ultrasound beam presents another tradeoff between image resolution and image signal-to-noise ratio (SNR). Image resolution may be increased by increasing the carrier frequency (e.g., from 4 MHz to 25 MHz); however, higher ultrasound frequencies do not penetrate tissues as well as lower frequencies, and as a result, at any given depth below the tissue surface the SNR of the image will be reduced. In practice this means that lower image resolution is required at deeper depths within the subject in order to maintain the image at a clinically useful quality.

Ultrasonic transducers for medical applications are constructed from one or more piezoelectric elements sandwiched between a pair of electrodes. Such piezoelectric elements are typically constructed of lead zirconate titanate (PZT), polyvinylidene diflouride (PVDF), or PZT ceramic/polymer composite. The electrodes are connected to a voltage source, and when a voltage is applied, the piezoelectric elements change in size at a frequency corresponding to that of the applied voltage. When a voltage pulse is applied, the piezoelectric element emits an ultrasonic wave into the media to which it is coupled at the frequencies contained in the excitation pulse. Conversely, when an ultrasonic wave strikes the piezoelectric element, the element produces a corresponding voltage across its electrodes. Typically, the front of the element is covered with an acoustic matching layer that improves the coupling with the media in which the ultrasonic waves propagate. In addition, a backing material is disposed to the rear of the piezoelectric element to absorb ultrasonic waves that emerge from the back side of the element so that they do not interfere. A number of such ultrasonic transducer constructions are disclosed in U.S. Pat. Nos. 4,217,684; 4,425,525; 4,441,503; 4,470,305 and 4,569,231.

When used for ultrasound imaging, the transducer typically has a number of piezoelectric elements arranged in an array and driven with separate voltages (apodizing). By controlling the time delay (or phase) and amplitude of the applied voltages, the ultrasonic waves produced by the piezoelectric elements (transmission mode) combine to produce a net ultrasonic wave focused at a selected point. By controlling the time delay and amplitude of the applied voltages, this focal point can be moved in a plane to scan the subject.

The same principles apply when the transducer is employed to receive the reflected sound (receiver mode). That is, the voltages produced at the transducer elements in the array are summed together such that the net signal is indicative of the sound reflected from a single focal point in the subject. As with the transmission mode, this focused reception of the ultrasonic energy is achieved by imparting separate time delay (and/or phase shifts) and gains to the signal from each transducer array element.

This form of ultrasonic imaging includes phased array sector scanning, linear array scanning and curvilinear array scanning. Such a scan includes a series of measurements in which the steered ultrasonic wave is transmitted, the system switches to receive mode after a short time interval, and the reflected ultrasonic wave is received and stored. Typically, the transmission and reception are steered along the same beam path during each measurement to acquire data from a series of points along an acoustic scan line. The receiver is dynamically focused at a succession of ranges (R) along the scan line as the reflected ultrasonic waves are received. The time required to conduct the entire scan is a function of the time required to make each measurement and the number of measurements required to cover the entire region of interest at the desired resolution and signal-to-noise ratio. For example, a total of 128 scan lines may be acquired over a 90 degree sector, with each scan line being steered in increments of 0.70 degrees. A number of such ultrasonic imaging systems are disclosed in U.S. Pat. Nos. 4,155,258; 4,155,260; 4,154,113; 4,155,259; 4,180,790; 4,470,303; 4,662,223; 4,669,314 and 4,809,184.

Recently a new image reconstruction method known in the art as highly constrained backprojection, or "HYPR", and described in co-pending U.S. patent application Ser. No. 11/482,372, filed on Jul. 7, 2006 and entitled "Highly Constrained Image Reconstruction Method" was disclosed, and is herein incorporated by reference. With the HYPR method a composite image is reconstructed from acquired data to provide a priori knowledge of the subject being imaged. This composite image is then used to highly constrain the image reconstruction process. HYPR has been used in a number of different imaging modalities including magnetic resonance imaging (MRI), x-ray computed tomography (CT), positron emission tomography (PET), single photon emission computed tomography (SPECT), and digital tomosynthesis (DTS).

As shown in FIG. 1, for example, when a series of time-resolved images 102 are acquired in a dynamic study, each image frame 102 may be reconstructed using a very limited set of acquired views. However, each such set of views is interleaved with the views acquired for other image frames 102, and after a number of image frames have been acquired, a sufficient number of different views are available to reconstruct a quality composite image 103 for use according to the HYPR method. A composite image 103 formed by using all the interleaved projections is thus much higher quality, and this higher quality is conveyed to the image frame by using the highly constrained image reconstruction method 104.

A discovery of the HYPR method is that good quality images can be produced with far fewer projection signal profiles if a priori knowledge of the signal contour in the FOV 212 is used in the reconstruction process. Referring to FIG. 2, for example, the signal contour in the FOV 212 may be known to include structures such as blood vessels 218 and 220. That being the case, when the backprojection path 208 passes through these structures a more accurate distribution of the signal sample 214 in each pixel is achieved by weighting the distribution as a function of the known signal contour at that pixel location. As a result, a majority of the signal sample 214 will be distributed in the example of FIG. 2 at the backprojection pixels that intersect the structures 218 and 220. For a backprojection path 208 having N pixels this highly constrained backprojection may be expressed as follows:

$$S_n = \frac{(P \times C_n)}{\sum_{n=1}^{N} C_n} \quad (1)$$

where: $S_n$ is the backprojected signal magnitude at a pixel n in an image frame being reconstructed, P is the signal sample value in the projection profile being backprojected, and $C_n$ is the signal value of an a priori composite image at the $n^{th}$ pixel along the backprojection path. The composite image is reconstructed from data acquired during the scan, and may include that used to reconstruct the image frame as well as other acquired image data that depicts the structure in the field of view. The numerator in equation (1) weights each pixel using the corresponding signal value in the composite image and the denominator normalizes the value so that all backprojected signal samples reflect the projection sums for the image frame and are not multiplied by the sum of the composite image.

While the normalization can be performed on each pixel separately after the backprojection, in many clinical applications it is far easier to normalize the projection, P, before the backprojection. In this case, the projection, P, is normalized by dividing by the corresponding value, $P_C$, in a projection through the composite image at the same view angle. The normalized projection, $P/P_C$, is then backprojected and the resulting image is then multiplied by the composite image.

A 3D embodiment of the highly constrained backprojection is shown pictorially in FIG. 3 for a single 3D projection view characterized by the view angles, θ and φ. This projection view is back projected along axis 216 and spread into a Radon plane 221 at a distance, r, along the back projection axis 216. Instead of a filtered back projection in which projection signal values are filtered and uniformly distributed into the successive Radon planes, along axis 216, the projection signal values are distributed in the Radon plane 221 using the information in the composite image. The composite image in the example of FIG. 3 contains vessels 218 and 220. The weighted signal contour value is deposited at image location, (x,y,z), in the Radon plane 221 based on the intensity at the corresponding location, (x,y,z), in the composite image. This is a simple multiplication of the backprojected signal profile value, P, by the corresponding composite image voxel value. This product is then normalized by dividing the product by the projection profile value from the corresponding image space projection profile formed from the composite image. The formula for the 3D reconstruction is:

$$I(x, y, z) = \sum \left( \frac{P(r, \theta, \phi) * C(x, y, z)_{(r,\theta,\phi)}}{P_C(r, \theta, \phi)} \right) \quad (2)$$

where the sum, $\Sigma$, is over all projections in the image frame being reconstructed and the (x,y,z) values in a particular Radon plane are calculated using the projection profile value, $P(r,\theta,\phi)$, at the appropriate $(r,\theta,\phi)$ value for that plane. $P_C(r,\theta,\phi)$ is the corresponding projection profile value from the composite image, and $C(x,y,z)_{(r,\theta,\phi)}$ is the composite image value at $(r,\theta,\phi)$.

The HYPR image reconstruction method has been used primarily to reduce image artifacts due to undersampling in MRI and x-ray CT. However, HYPR can also be used to improve the SNR of an image. For example, the image frames 102 may be acquired in a dynamic study in which the dosage (e.g., x-ray) or exposure time (e.g., PET or SPECT) is reduced for each image frame. In this case the composite image is formed by accumulating or averaging measurements from the series of acquired low SNR image frames 102 to produce a higher SNR composite image 102. The highly constrained image 104 produced from each image frame 102 takes on the higher SNR of this composite image.

SUMMARY OF THE INVENTION

The present invention is a method for producing a series of ultrasound images at a substantially higher resolution and without a substantial reduction in image SNR. Referring particularly to FIG. 1, higher resolution, lower SNR ultrasound image frames 102 are acquired and a composite image 103 having a much higher SNR than a single ultrasound image frame 102 is formed by combining a plurality of image frames 102. Each acquired ultrasound image frame 102 is processed with a HYPR method using information in the composite image 103 to produce a highly constrained image frame 104 that inherits the higher SNR of the composite image 103, but retains the temporal and spatial resolution of the acquired image frame 102. This enhancement in image SNR enables the use of higher ultrasound frequencies so that the spatial resolution of the ultrasound image frames 102 are substantially increased.

It is therefore an aspect of the invention to increase the spatial resolution of ultrasound images without substantially reducing their SNR or temporal resolution. The SNR of the composite image is increased as a function of the number of ultrasound image frames used to produce it, and this increased SNR is passed on to each highly constrained image frame.

Another aspect of the present invention provides a method for producing ultrasound images with undersampled echo signal data. To maintain a desired frame rate and image quality parameters, a series of ultrasound image frames may be acquired from interleaved locations in the object being imaged. The composite image 103 is formed by combining undersampled image frames 102 to form a fully sampled composite image. Each undersampled ultrasound image frame 102 is HYPR processed using the fully sampled composite image 103 to produce a highly constrained image frame 104 that inherits the quality of the composite image 103 without losing its spatial or temporal resolution.

Yet another aspect of the invention is to tradeoff echo sampling density for each image frame in order to achieve other desirable objectives, and restore the image frame quality to substantially the same level as a fully sampled image. This is achieved by forming a composite image that contains a priori information about the subject being imaged and using that information to improve image frame quality.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE PREFERRED EMBODIMENT

Figure 4:
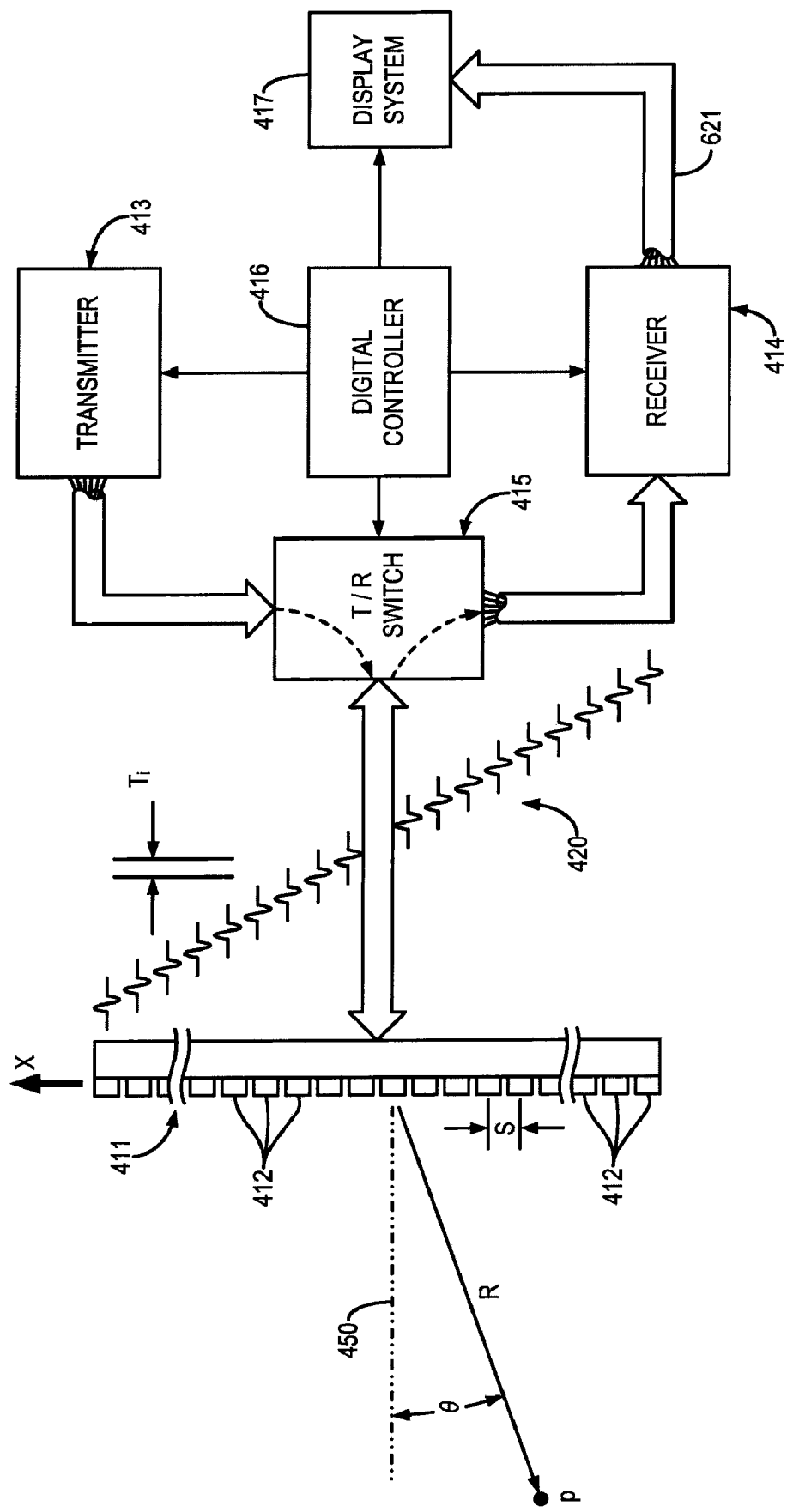
FIG. 4 is a block diagram of an ultrasonic imaging system that employs the present invention.

Referring particularly to FIG. 4, an ultrasonic imaging system includes a transducer array 411 comprised of a plurality of separately driven elements 412 which each produce a burst of ultrasonic energy when energized by a pulse produced by a transmitter 413. The ultrasonic energy reflected back to the transducer array 411 from the subject under study is converted to an electrical signal by each transducer element 412 and applied separately to a receiver 414 through a set of switches 415. The transmitter 413, receiver 414, and the switches 415 are operated under the control of a digital controller 416 responsive to the commands input by the human operator. A complete scan is performed by acquiring a series of echoes in which the switches 415 are set to their transmit position and the transmitter 413 is gated on momentarily to energize each transducer element 412. The switches 415 are then set to their receive position and the subsequent echo signals produced by each transducer element 412 are applied to the receiver 414. The separate echo signals from each transducer element 412 are combined in the beam former of the receiver 414 to produce a single echo signal which is employed to produce an acoustic scan line in an image on a display system 417.

The transmitter 413 drives the transducer array 411 such that the ultrasonic energy produced is directed, or steered, in a beam. A B-scan can therefore be performed by moving this beam through a set of angles from point-to-point, or a set of parallel beam lines for linear arrays, rather than physically moving the transducer array 411. To accomplish the former, the transmitter 413 imparts a time delay, $T_i$, to the respective pulses 420 that are applied to successive transducer elements 412. If the time delay is zero ($T_i=0$), all the transducer elements 412 are energized simultaneously and the resulting ultrasonic beam is directed along an axis 450 normal to the transducer face and originating from the center of the transducer array 411. As the time delay, $T_i$, is increased as illustrated in FIG. 4, the ultrasonic beam is directed downward from the central axis 450 by an angle θ.

Referring still to FIG. 4, the echo signals produced by each burst of ultrasonic energy emanate from reflecting objects located at successive positions along the ultrasonic beam. These are sensed separately by each segment 412 of the transducer array 411 and a sample of the magnitude of the echo signal at a particular point in time represents the amount of reflection occurring at a specific range, R. Due to the differences in the propagation paths between a focal point, p, and each transducer element 412, however, these echo signals will not occur simultaneously and their amplitudes will not be equal. The function of the receiver 414 is to amplify these separate echo signals, impart the proper time delay to each and sum them together to provide a single echo signal which accurately indicates the total signal amplitude reflected from each point, p, located at range, R, along the ultrasonic beam oriented at the angle θ. Analogous transmit-receive and beam forming functions are performed when either a linear or curvilinear array is employed.

To simultaneously sum the electrical signals produced by the echoes from each transducer element 412, time delays are introduced into each separate transducer element channel of the receiver 414. In the case of the phased array 411, the delay introduced in each channel may be divided into two components, one component is referred to as a beam steering time delay, and the other component is referred to as a beam focusing time delay. The beam steering and beam focusing time delays for reception are similar in magnitude and functionality to $T_i$, that is, the transmission delays described above. However, the focusing time delay component introduced into each receiver channel is continuously changing during reception of the echo to provide dynamic focusing of the received beam at the range, R, from which the echo signal emanates.

Under the direction of the digital controller 416, the receiver 414 provides delays during the scan such that the steering of the receiver 414 tracks with the direction of the beam steered by the transmitter 413, samples the echo signals at a succession of ranges, and provides the proper delays to dynamically focus at points, p, along the beam. Thus, each emission of an ultrasonic pulse results in the acquisition of a series of data points which represent the amount of reflected sound from a corresponding series of points, p, located along the ultrasonic beam.

The display system 417 receives the series of data points produced by the receiver 414 and converts the data to a form producing the desired image. For example, if an A-scan is desired, the magnitude of the series of data points is merely graphed as a function of time. If a B-scan is desired, each data point in the series is used to control the brightness of a pixel in the image, and a scan comprised of a series of measurements at successive steering angles or beam positions is performed to provide the data necessary for display of a 2D image.

Figure 5:
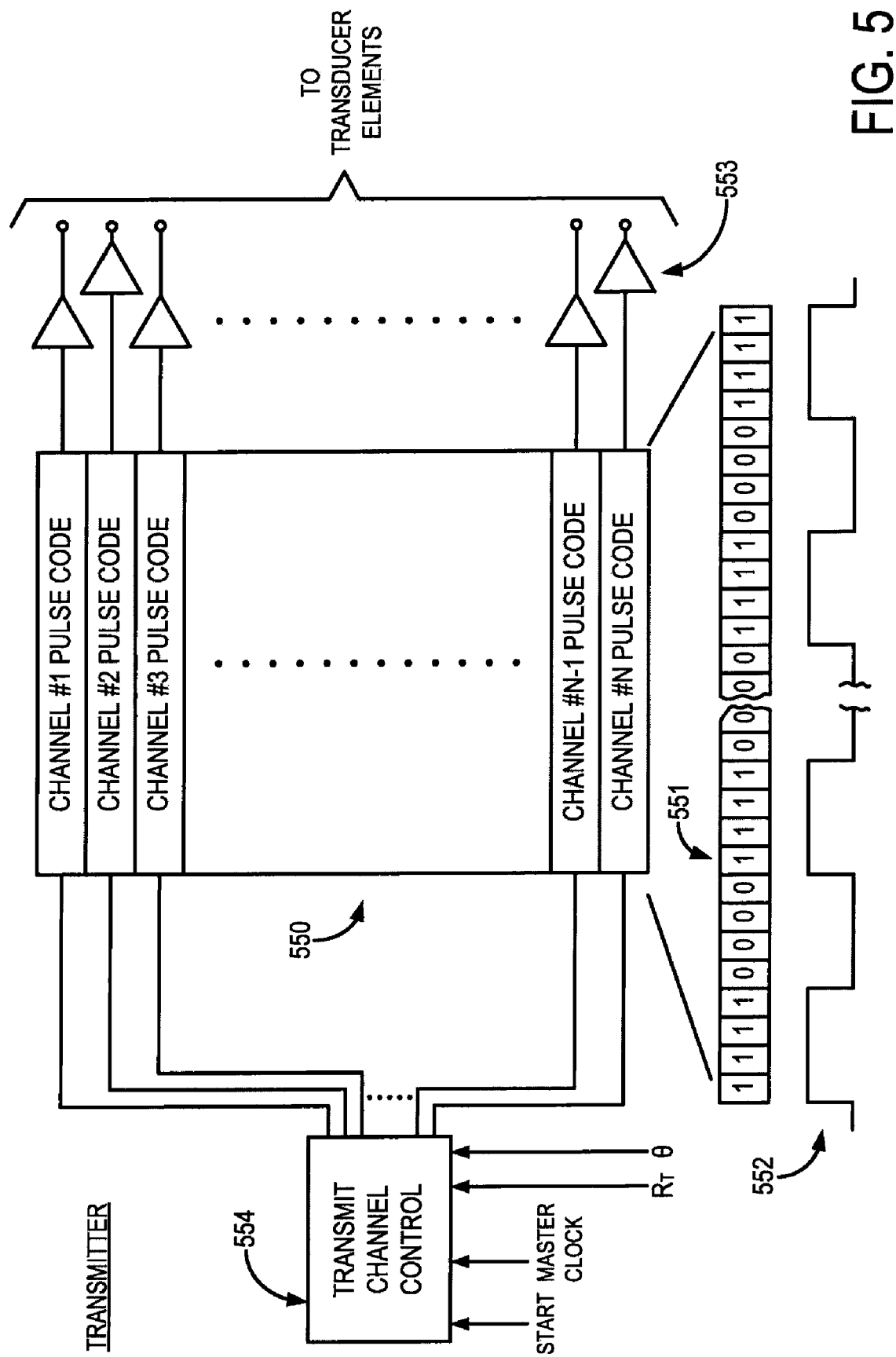
FIG. 5 is a block diagram of a transmitter that forms part of the system of FIG. 4.

Referring particularly to FIG. 5, the transmitter 513 includes a set of channel pulse code memories which are indicated collectively at 550. In the preferred embodiment there are 192 separate transducer elements 412, and therefore, there are 192 separate channel pulse code memories 550. Each pulse code memory 550 is typically a memory which stores a bit pattern 551 that determines the frequency of the ultrasonic pulse 552 that is to be produced. In the preferred embodiment, this bit pattern is read out of each pulse code memory 550 by a master clock and applied to a driver 553 which amplifies the signal to a power level suitable for driving the transducer 411. In the example shown in FIG. 5, the bit pattern is a sequence of four "1" bits alternated with four "0" bits to produce a transducer drive 552. The transducer elements 411 to which these ultrasonic pulses 552 are applied respond by producing ultrasonic energy.

As indicated above, to steer the transmitted beam of the ultrasonic energy in the desired direction, θ, the pulses 552 for each of the N channels must be delayed by the proper amount. These delays are provided by a transmit control 554 which receives four control signals from the digital controller 416 (FIG. 4). Using the input control signal, θ, the transmit control 554 calculates the delay increment, $T_i$, required between successive transmit channels. When the START control signal is received, the transmit control 554 gates one of four possible phases of the MASTER CLOCK signal through to the first transmit channel 550. At each successive delay time interval, $T_i$, thereafter, the MASTER CLOCK signal is gated through to the next channel pulse code memory 550 until all N channels are producing their ultrasonic pulses 552. Each transmit channel 550 is reset after its entire bit pattern 551 has been transmitted and the transmitter 413 then waits for the next θ and next START control signals from the digital controller 416.

Figure 6:
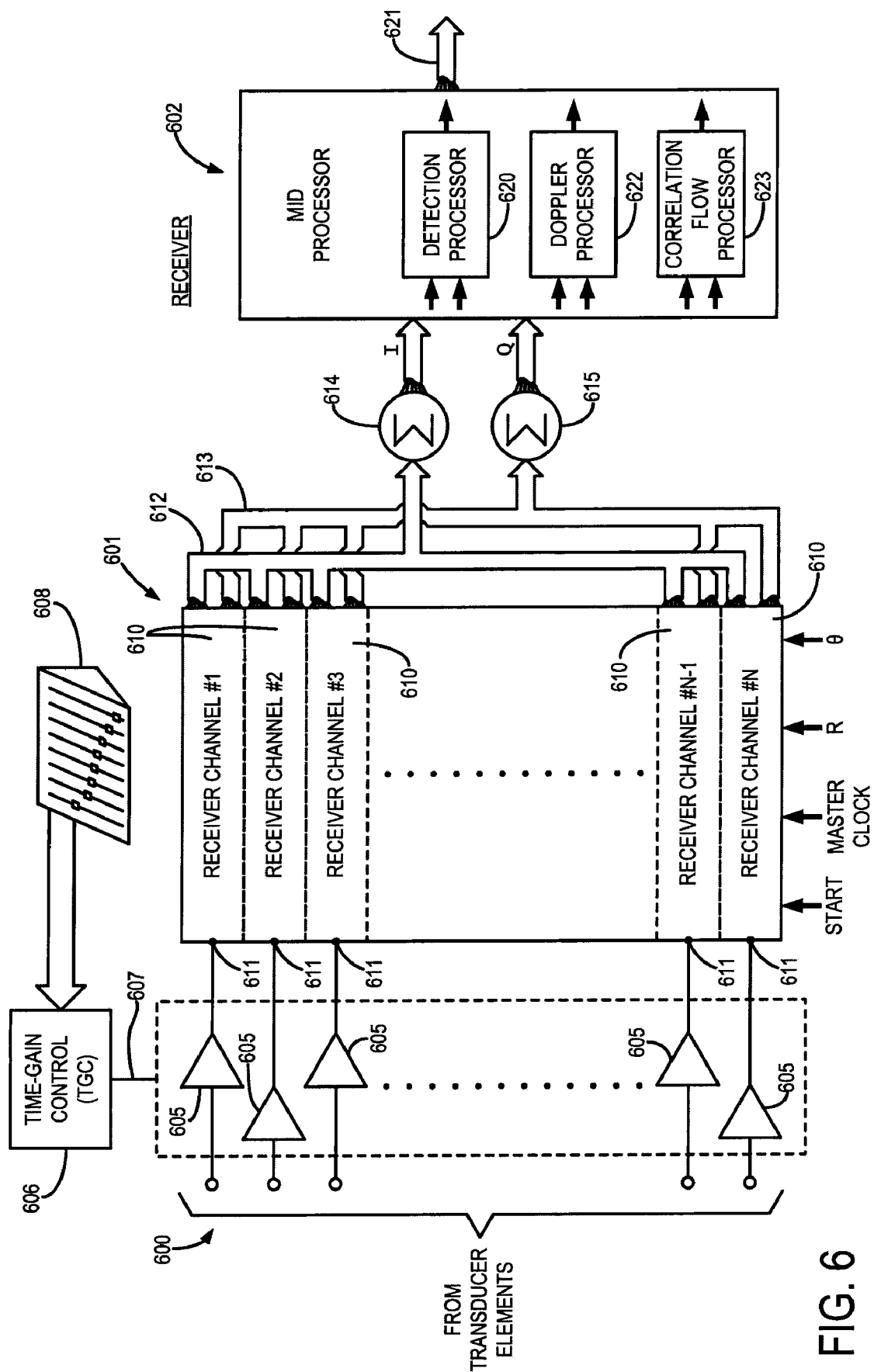
FIG. 6 is a block diagram of a receiver that forms part of the system of FIG. 4.

Referring particularly to FIG. 6, the receiver 414 is comprised of three sections: a time-gain control section 600, a beam forming section 601, and a mid processor 602. The time-gain control section 600 includes an amplifier 605 for each of the N receiver channels and a time-gain control circuit 606. The input of each amplifier 605 is connected to a respective one of the transducer elements 412 to receive and amplify the echo signal which it receives. The amount of amplification provided by the amplifiers 605 is controlled through a control line 607 that is driven by the time-gain control circuit 606. As is well known in the art, as the range of the echo signal increases, its amplitude is diminished. As a result, unless the echo signal emanating from more distant reflectors is amplified more than the echo signal from nearby reflectors, the brightness of the image diminishes rapidly as a function of range, R. This amplification is controlled by the operator who manually sets eight (typically) TGC linear potentiometers 608 to values which provide a relatively uniform brightness over the entire range of the sector scan. The time interval over which the echo signal is acquired determines the range from which it emanates, and this time interval is divided into eight segments by the TGC control circuit 606. The settings of the eight potentiometers are employed to set the gain of the amplifiers 605 during each of the eight respective time intervals so that the echo signal is amplified in ever increasing amounts over the acquisition time interval.

The beam forming section 601 of the receiver 414 includes separate receiver channels 610. As will be explained in more detail below, each receiver channel 610 receives the analog echo signal from one of the TGC amplifiers 605 at an input 611, and it produces a stream of digitized output values on an I bus 612 and a Q bus 613. Each of these I and Q values represents a sample of the echo signal envelope at a specific range, R. These samples have been delayed in the manner described above such that when they are summed at summing points 614 and 615 with the I and Q samples from each of the other receiver channels 610, they indicate the magnitude and phase of the echo signal reflected from a point, p, located at range R on the steered beam, θ. In the preferred embodiment, each echo signal is sampled at intervals of about 650 micrometers over the entire range of the scan line (typically 40 to 200 millimeters).

Referring still to FIG. 6, the mid processor section 602 receives the beam samples from the summing points 614 and 615. The I and Q values of each beam sample is a 16-bit digital number which represents the in-phase and quadrature components of the magnitude of the reflected sound from a point (R,θ). The mid processor 602 can perform a variety of calculations on these beam samples, where choice is determined by the type of image to be reconstructed. For example, if a conventional magnitude image is to be produced, a detection process indicated at 620 is implemented in which a digital magnitude, M, is calculated from each beam sample and output at 621, according to:

$$M = \sqrt{I^2 + Q^2}. \tag{3}$$

The mid processor may also include a Doppler processor 612 such as that described in U.S. Pat. No. 4,217,909 issued on Aug. 19, 1980 and entitled "Directional Detection of Blood Velocities In An Ultrasound System"; or such as that described in U.S. Pat. No. 4,265,126 issued on May 5, 1981 and entitled "Measurement of True Blood Velocity By an Ultrasound System". Such Doppler processors often employ the phase information, φ, contained in each beam sample to determine the velocity of reflecting objects along the direction of the beam (i.e. radial direction from the center of the transducer 411), where:

$$\varphi = \tan^{-1}\left(\frac{Q}{I}\right). \tag{4}$$

The mid processor may also include a correlation flow processor 623, such as that described in U.S. Pat. No. 4,587,973, issued May 13, 1986 and entitled "Ultrasonic Method And Means For Measuring Blood Flow And The Like Using Autocorrelation". Such methods measure the motion of reflectors by following the shift in their position between successive ultrasonic pulse measurements. If the successive measurements are at the same beam angle, θ, motion of the reflectors along the beam direction is measured, whereas if successive measurements are made at different beam angles, θ, then the cross correlation can measure motion of the reflectors in other directions.

Figure 7:
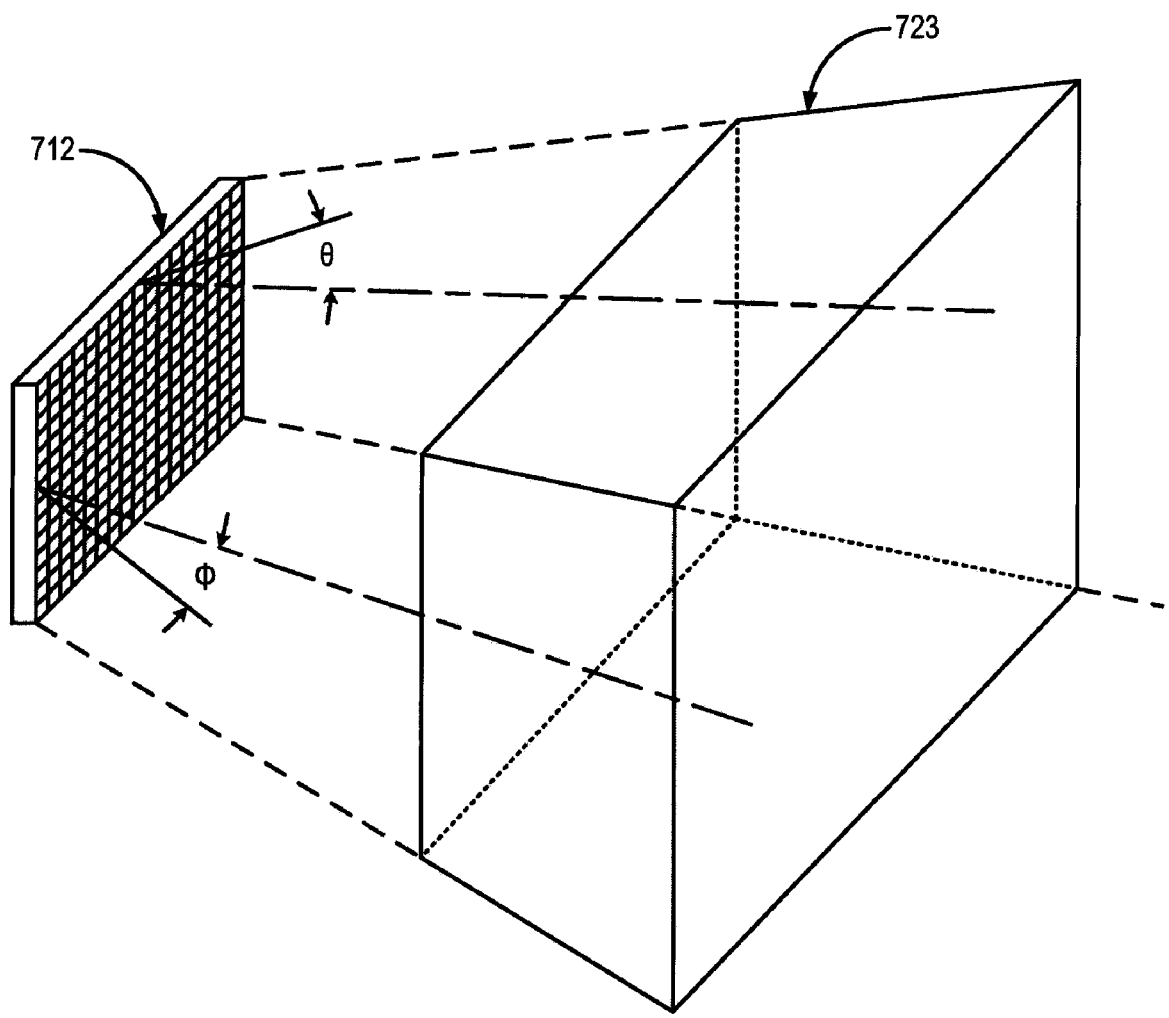
FIG. 7 is a pictorial view of a 2D transducer and the 3D volume from which it acquires echo signals.

It should be apparent to those skilled in the art that many variations are possible from the ultrasound system described above. For example, a 3D system may be formed by adding additional rows of elements 412 to the transducer 411 to form a two-dimensional transducer array 712 shown in FIG. 7. During a scan to acquire one image frame, successive rows of elements in the transducer 712 may be energized and steered through a set of angles, θ, as described above to acquire a succession of 2D planes from the 3D volume of interest 723. Or, all of the elements in the transducer 712 may be repeatedly energized and their phases controlled such that a succession of beams and resulting echo signals sample the entire 3D volume 723. In the latter case the beam is steered in one plane at angles, θ, and is steered in a perpendicular plane at angles, φ. Regardless of which method is used, it takes time to sample the entire 3D volume, particularly if it is located at a significant distance, or tissue depth, from the transducer 712.

The present invention enables the image frame rate of an ultrasound system to be increased by undersampling each acquired image frame. More specifically, for the phased array embodiment, rather than producing all the steered beams to sample each location in the 3D volume 723, each image frame acquires a set of echoes, or views, from less than all angles, θ and φ. For example, rather than acquiring each of 128 beam angles during the acquisition of one image frame, every fourth vertical beam angle, φ, is acquired for all horizontal beam angles, θ. In the subsequent acquired image frames the vertical beam angles, h, are interleaved with those already acquired. Thus, after the acquisition of four undersampled image frames, all the beam angle combinations have been acquired to completely sample the entire 3D volume 723. In this example, the rate at which image frames are acquired is increased by a factor of four to improve temporal resolution by four. As will be described below, the quality of each undersampled image frame is maintained by using a HYPR image construction method.

Another clinical application of the present invention arises when it is desired to increase image resolution by increasing the RF carrier frequency of the ultrasound beam and echo signal. When this is done the SNR of the fully sampled image is reduced because the higher frequency ultrasound is attenuated more as it passes through tissues. The present invention solves this problem by acquiring a series of such images and then combining them to form a composite image having a higher SNR. The highly constrained image processing is then used to transfer the higher SNR of this composite image to each image frame.

Figure 1:
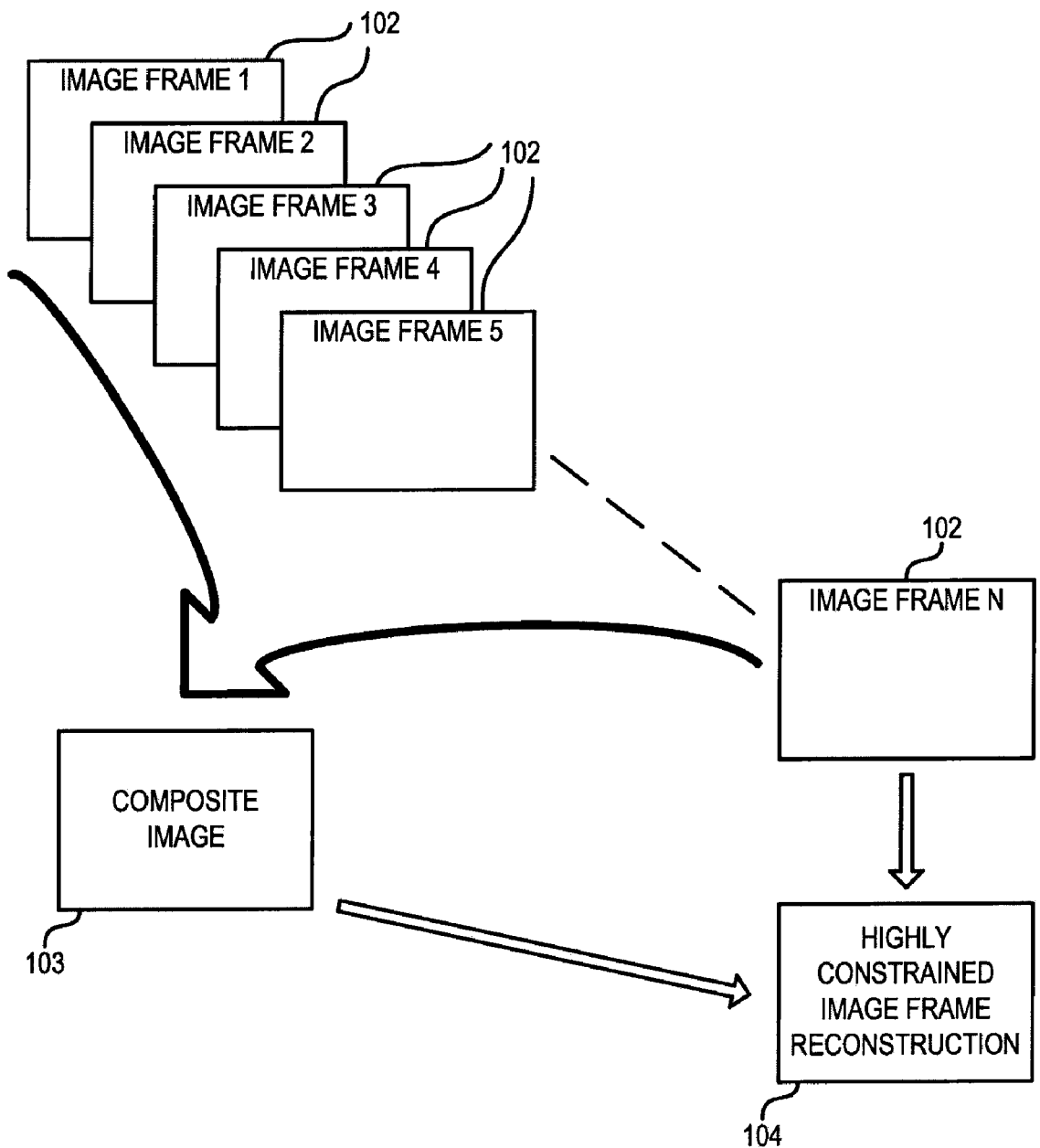
FIG. 1 is a pictorial view illustrating a highly constrained backprojection (HYPR) reconstruction method as applied to medical imaging applications.
Figure 2:
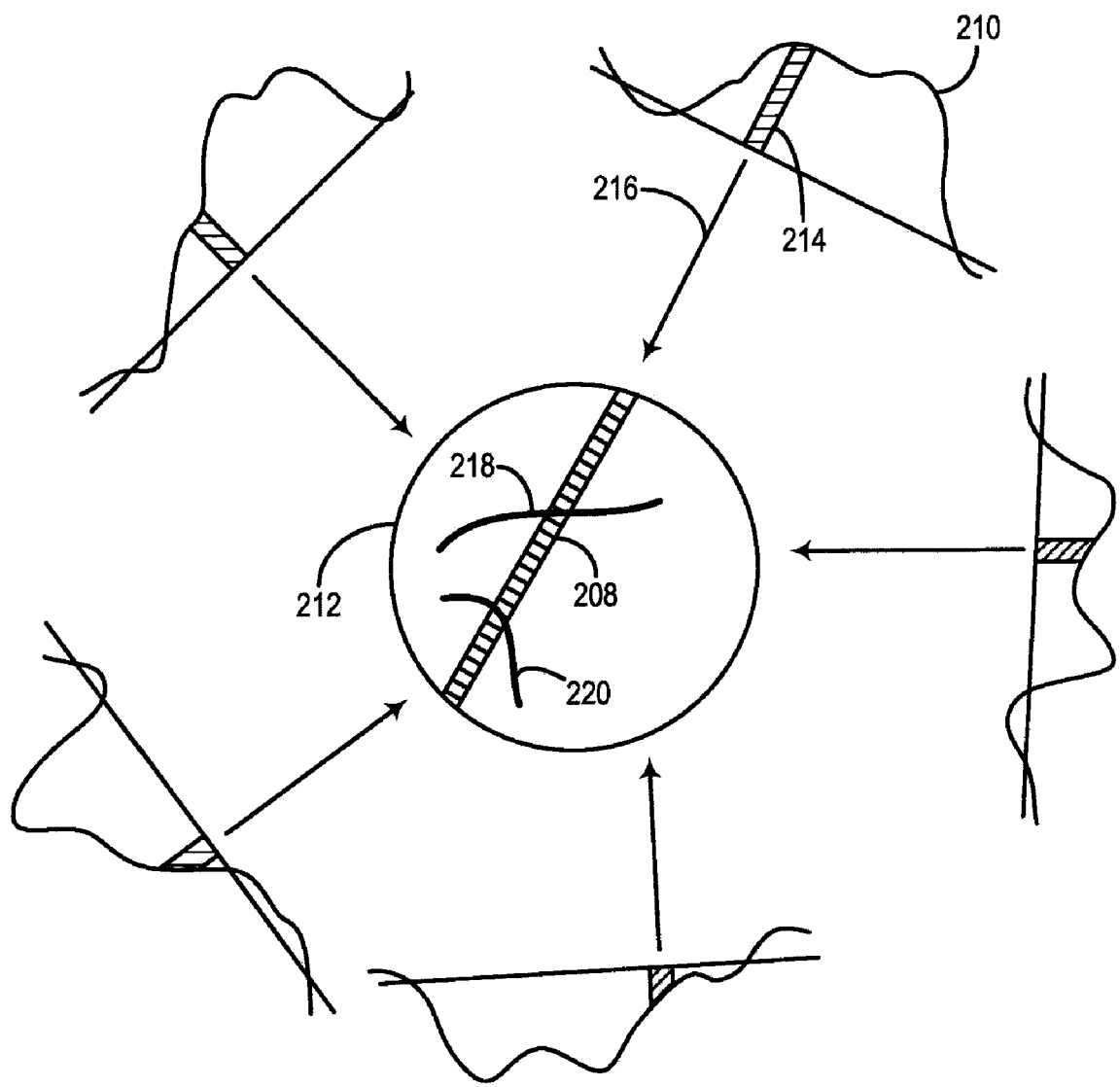
FIG. 2 is a pictorial representation of a highly constrained 2D backprojection method.
Figure 3:
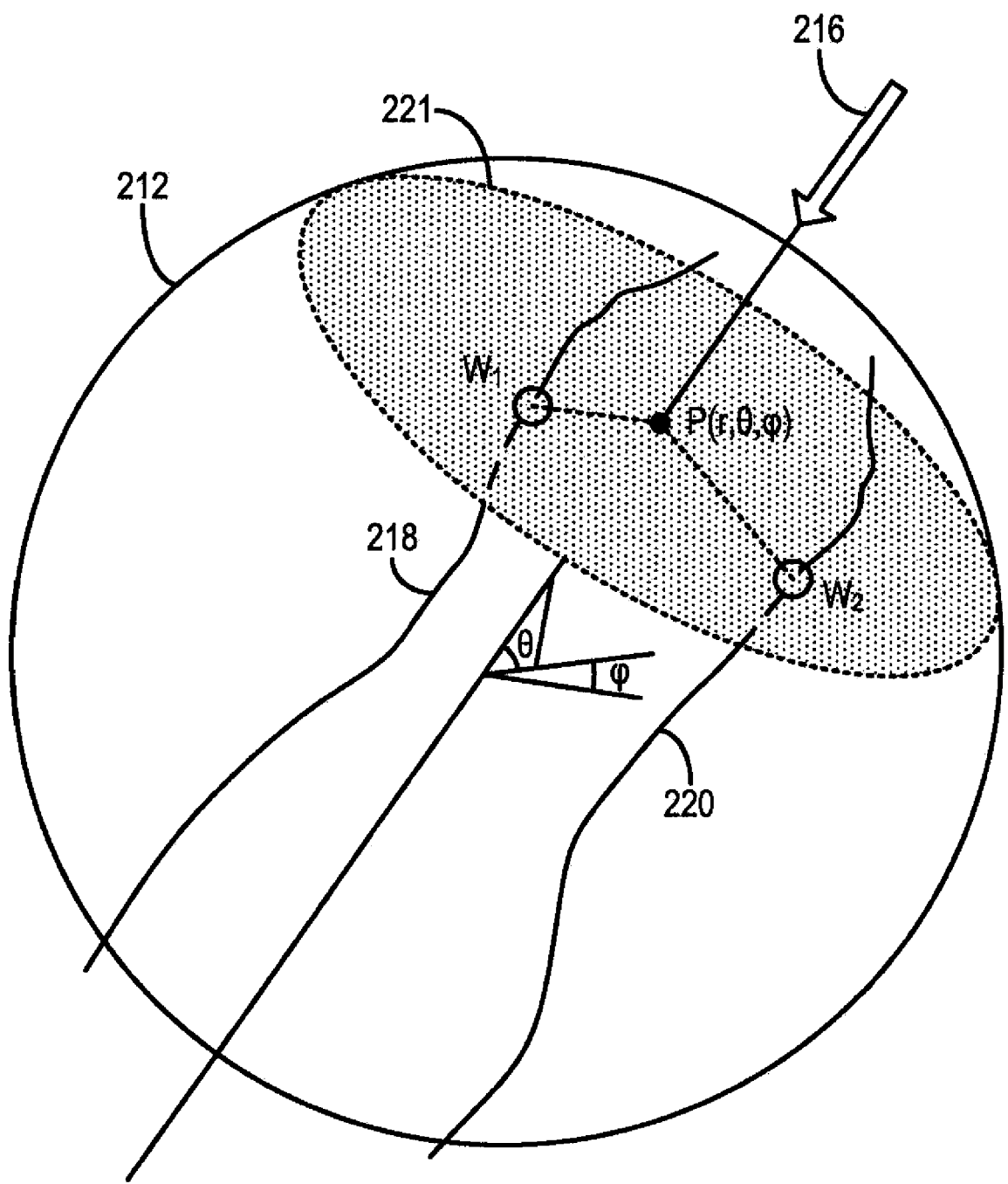
FIG. 3 is a pictorial representation of a highly constrained 3D backprojection method.
Figure 8:
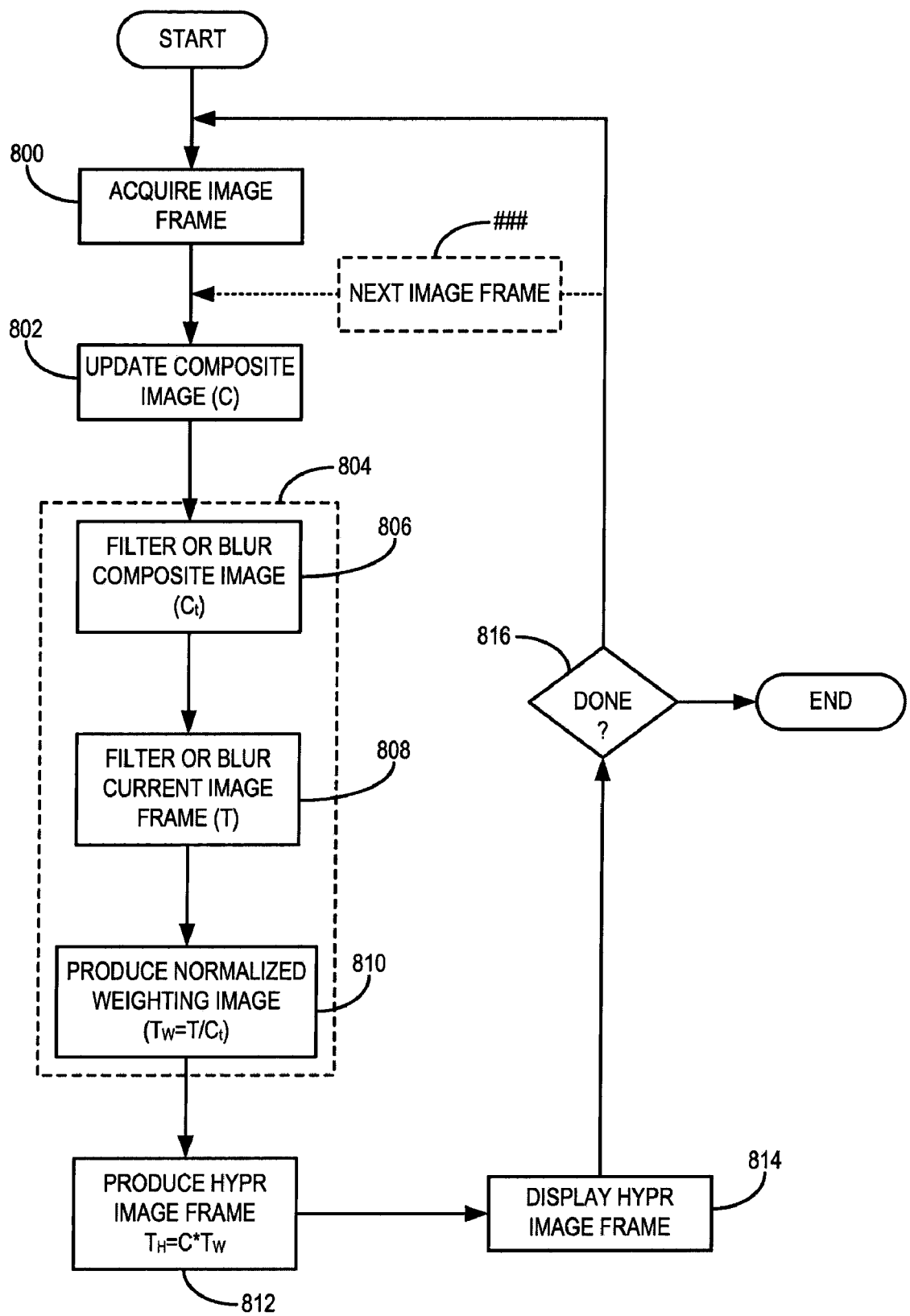
FIG. 8 is a flowchart that describes the steps used to HYPR process acquired ultrasound image frames.

Referring particularly to FIGS. 1 and 8, the highly constrained image processing is carried out by the midprocessor 602 on acquired 2D image frames 102. As each image frame 102 is acquired as indicated at process block 800, it is stored and a copy is used to update a composite image 103, as indicated at process block 802. The composite image 103 is an "accumulation" of the current image frame 102 with a preselected number of other acquired image frames 102. In one embodiment of the invention, the accumulation is the matrix addition of corresponding pixels in the 2D image frames 102 divided by the number of image frames contributing to the accumulation. The result is a composite image 103 that has an increased SNR that is directly proportional to the preselected number of accumulated image frames 102. For example, if 16 2D image frames 102 are accumulated, the SNR will be 4 times the SNR of a single 2D image frame 102. The number of image frames 102 used to form the composite image will depend on the particular clinical procedure being performed.

In another embodiment of the invention this accumulation is the combination of echo signal samples from a plurality of undersampled image frames 102 to form a fully sampled composite image 103. The number of image frames 102 that are combined depends on the degree of undersampling used, and this in turn depends on the particular medical application.

As indicated generally at 804, the next step is to produce a normalized weighting image using the current ultrasound image frame 102 and the updated composite image 103. There are a number of different ways to perform this step and the preferred method is shown in FIG. 8. More specifically, the updated composite image 103 is "blurred" by filtering as indicated at process block 806. In general, the filtering is a convolution process in which the updated composite image array 103 is convolved with a filter kernel. In the preferred embodiment the filter kernel is a square filter kernel. The kernel size should be selected so that when the blurring is done the kernel does not include much information from outside the subject of interest (for example a blood vessel). The filter kernel should be on the order of the dimension of the objects being examined or somewhat smaller. Gaussian or other smooth filter kernels may also be used and the resulting filter function being performed is essentially low pass filtering.

Referring still to FIG. 8, the current ultrasound image frame 102 is also blurred or filtered in the same manner as indicated at process block 808. That is, the ultrasound image frame array 102 is convolved with the filter kernel to perform a low pass filtering function. As indicated at process block 810, the normalized weighting image, $T_W$, is then produced by dividing pixel values in the filtered current image frame, T, by the corresponding pixel values in the filtered composite image, $C_t$.

As indicated at process block 812, a highly constrained (HYPR) image frame 104 is then produced. This image frame 104 is produced by multiplying the updated composite image array 103 by the normalized weighting image array, $T_W$. This is a multiplication of corresponding pixel values in the two images. The resulting HYPR image 104 is then output to the display 417 as indicated at process block 814 and the system loops back to acquire and process the next ultrasound image frame 102. When the procedure is completed, as determined at decision block 816, the processing ends.

Figure 9:
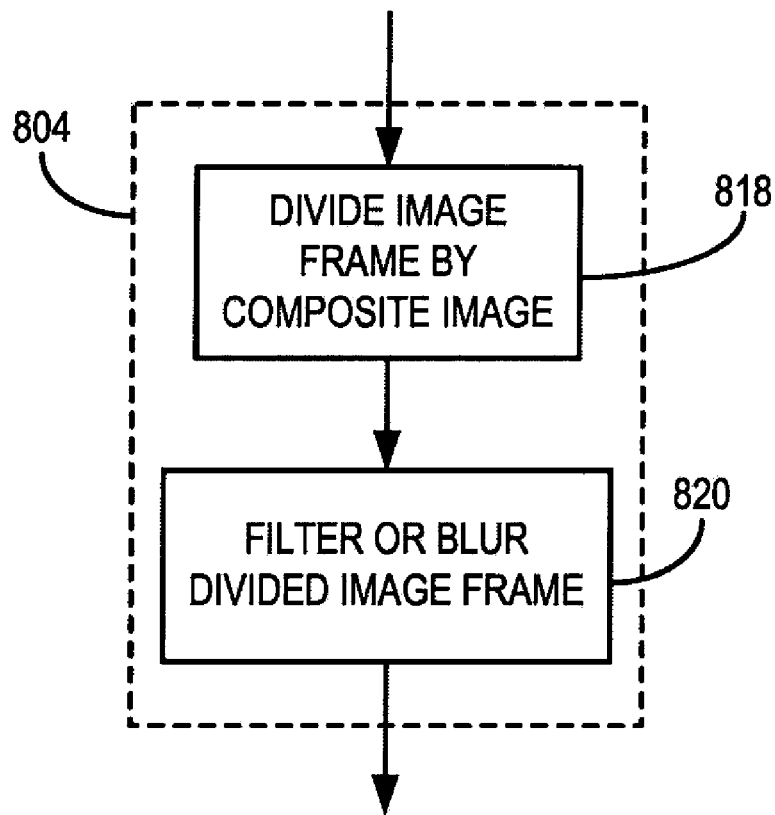
FIG. 9 is a first alternative method for producing a normalized weighting image in the process of FIG. 8.
Figure 10:
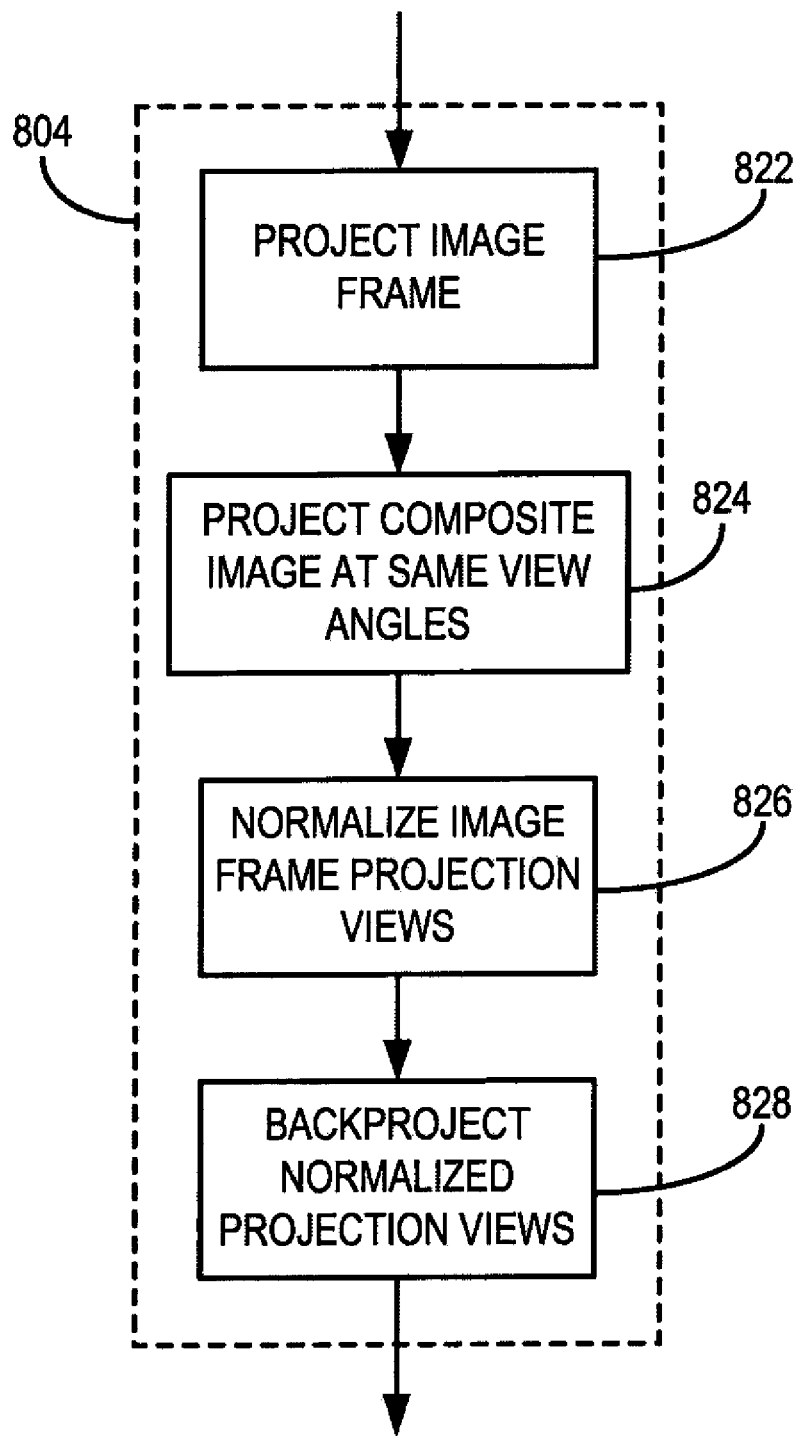
FIG. 10 is a second alternative method for producing a normalized weighting image in the process of FIG. 8.

As indicated above, there are a number of alternative methods for producing the normalized weighting image, $T_W$. Two of these methods are illustrated in FIGS. 9 and 10. Referring particularly to FIG. 9, the first alternative method includes a first step, indicated at process block 818, of dividing the acquired ultrasound image frame array 102 by the updated composite image 103. This is a division of every pixel value in the acquired image frame array 102 by the corresponding pixel value in the updated composite image array 103. The resulting divided image frame is then blurred or filtered as indicated at process block 820 to produce the normalized weighting image, $T_W$. This filtering operation is the same convolution process discussed above with respect to process blocks 806 and 808. The same result can be achieved, of course by first blurring the image frame 102 and updated composite image 103 and then performing the division operation.

Another alternative method for producing the normalized weighting image, $T_W$, is illustrated in FIG. 10. This method transforms, or "reprojects", the acquired ultrasound image frame 102 to Radon space by calculating projection views of the image from different view angles as indicated at process block 822. As indicated at process block 824, the updated composite image 103 is also transformed to Radon space by calculating projection views at the same set of view angles used to transform the ultrasound image frame 102. As indicated at process block 826 the image frame projection views P are then normalized by dividing them by the composite image projection views $P_C$. This is a division of corresponding elements in the projections, P and $P_C$, at the same view angle. The normalized weighting image, $T_W$, is then produced at process block 828 by backprojecting the normalized projections, $P/P_C$, in a conventional manner. This is not a filtered backprojection, but a straight forward backprojection; however, in the alternative a filtered backprojection can be employed.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for producing an image with an ultrasound system, the method comprising the steps of:
    a) acquiring, with the ultrasound system, a series of ultrasound image frames;
    b) producing a composite image by accumulating a plurality of ultrasound image frames in the acquired series of ultrasound image frames, wherein the plurality of ultrasound image frames are acquired during a time window that includes a selected ultrasound image frame;
    c) calculating a normalized weighting image using the selected ultrasound image frame and the composite image;
    d) producing a constrained image by multiplying the normalized weighting image by the composite image; and
    e) repeating steps b) through d) with successive different selected ultrasound image frames.

2. The method as recited in claim 1 in which step c) includes:
    c)i) blurring the composite image;
    c)ii) blurring the selected ultrasound image frame; and
    c)iii) dividing the blurred selected ultrasound image frame by the blurred composite image.

3. The method as recited in claim 2 in which steps c)i) and c)ii) are performed by convolving the composite image and selected ultrasound image frame with a filter kernel.

4. The method as recited in claim 1 in which step c) includes:
    c)i) dividing the selected ultrasound image frame by the composite image; and
    c)ii) blurring the divided image produced in step c)i).

5. The method as recited in claim 4 in which step c)ii) includes convolving the divided image with a filter kernel.

6. The method as recited in claim 1 in which step c) includes:
    c)i) producing image frame projections by transforming the selected ultrasound image frame at a set of view angles;
    c)ii) producing composite image projections by transforming the composite image at the same set of view angles used in step c)i);
    c)iii) normalizing the image frame projections by dividing each image frame projection by the composite image projection at the corresponding view angle; and
    c)iv) backprojecting the normalized image frame projections.

7. The method as recited in claim 1 in which the ultrasound image frames are accumulated in step b) by adding their corresponding pixel values together and dividing each summed pixel value by the number of ultrasound image frames that are accumulated.

8. The method as recited in claim 1 in which the ultrasound image frames are undersampled and are accumulated in step b) by combining values at different sample locations.

9. A method for producing an image with an ultrasound system, the method comprising the steps of:
    a) acquiring, with the ultrasound system, a series of ultrasound image frames;
    b) producing a composite image from the acquired series of ultrasound image frames;
    c) blurring the composite image;
    d) blurring a selected ultrasound image frame in the acquired series of ultrasound image frames;
    e) producing a normalized weighting image using the blurred selected ultrasound image frame and the blurred composite image;
    f) producing a highly constrained image by multiplying the normalized weighting image produced in step e) by the composite image produced in step b); and
    g) repeating steps d) through e) with successive different selected ultrasound image frames.

10. The method as recited in claim 9 in which step b) includes adding the corresponding pixel values of a plurality of individual ultrasound image frames that are acquired during a time window and dividing each summed pixel value by the number of ultrasound image frames that are accumulated.

11. The method as recited in claim 10 in which step e) includes:
- e)i) producing image frame projections by transforming the blurred selected ultrasound image frame at a set of view angles;
- e)ii) producing composite image projections by transforming the blurred composite image at the same set of view angles used in step e)i);
- e)iii) normalizing the image frame projections by dividing each image frame projection by the composite image projection at the corresponding view angle; and
- e)iv) backprojecting the normalized image frame projections.

12. The method as recited in claim 9 in which the ultrasound image frames in the acquired series of ultrasound image frames are each undersampled and are accumulated in step b) by combining values at different sample locations.

13. The method as recited in claim 9 in which step c) includes convolving the composite image with a first filter kernel and step d) includes convolving the selected ultrasound image frame with a second filter kernel.

14. The method as recited in claim 13 in which steps c) and d) include using at least one of a Gaussian kernel, a smoothing kernel, and a square kernel.

15. A method for producing an image with an ultrasound system, the steps comprising:
- a) acquiring, with the ultrasound system, a series of ultrasound image frames;
- b) producing a composite image from the acquired series of ultrasound image frames;
- c) producing composite image projections by transforming the composite image at a set of view angles;
- d) producing image frame projections by transforming a selected ultrasound image frame at the set of view angles used in step c);
- e) normalizing the image frame projections by dividing each image frame projection by the composite image projection at the corresponding view angle;
- f) producing a normalized weighting image by backprojecting the normalized image frame projections;
- g) producing a highly constrained image by multiplying the normalized weighting image produced in step f) by the composite image produced in step b); and
- h) repeating steps d) through g) with successive different selected ultrasound image frames.

* * * * *